(12) United States Patent
Takahashi et al.

(10) Patent No.: US 8,393,426 B2
(45) Date of Patent: Mar. 12, 2013

(54) VEHICLE STRUCTURE OF A HYBRID VEHICLE

(75) Inventors: Yuji Takahashi, Toyota (JP); Takashi Furusawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/146,904

(22) PCT Filed: Jun. 25, 2009

(86) PCT No.: PCT/JP2009/061637
§ 371 (c)(1),
(2), (4) Date: Jul. 28, 2011

(87) PCT Pub. No.: WO2010/150386
PCT Pub. Date: Dec. 29, 2010

(65) Prior Publication Data
US 2011/0284299 A1  Nov. 24, 2011

(51) Int. Cl.
*B60K 6/40* (2007.10)
*B60K 1/04* (2006.01)
*B60K 15/063* (2006.01)

(52) U.S. Cl. .................. 180/68.5; 180/69.4; 903/951

(58) Field of Classification Search ............... 180/65.21, 180/68.5, 69.4; 903/951, 952
See application file for complete search history.

(56) References Cited

U.S. PATENT DOCUMENTS

| | | | | |
|---|---|---|---|---|
| 4,013,300 A | * | 3/1977 | Berger | 280/834 |
| 6,651,764 B2 | * | 11/2003 | Fournier et al. | 180/190 |
| 2003/0047366 A1 | * | 3/2003 | Andrew et al. | 180/68.5 |
| 2004/0243885 A1 | | 12/2004 | James et al. | |
| 2006/0237248 A1 | | 10/2006 | Hayashi | |
| 2008/0000703 A1 | | 1/2008 | Shindou | |
| 2008/0196957 A1 | | 8/2008 | Koike et al. | |
| 2009/0025989 A1 | | 1/2009 | Takaku | |
| 2010/0101881 A1 | * | 4/2010 | Yoda et al. | 180/68.5 |
| 2010/0307848 A1 | * | 12/2010 | Hashimoto et al. | 180/68.5 |
| 2011/0284299 A1 | * | 11/2011 | Takahashi et al. | 180/65.21 |

FOREIGN PATENT DOCUMENTS

| | | |
|---|---|---|
| CN | 1914057 A | 2/2007 |
| JP | 06-211169 A | 8/1994 |
| JP | 2000-238541 A | 9/2000 |
| JP | 2001-138753 A | 5/2001 |
| JP | 2001-180304 A | 7/2001 |
| JP | 2004-196217 A | 7/2004 |

(Continued)

OTHER PUBLICATIONS

International Search Report mailed Sep. 15, 2009 of PCT/JP2009/061637.

*Primary Examiner* — Frank Vanaman
(74) *Attorney, Agent, or Firm* — Kenyon & Kenyon LLP

(57) ABSTRACT

A vehicle structure of a hybrid vehicle that contributes to compactly structuring the vehicle body, which is provided with: a battery disposed at the lower side in a vehicle up-down direction of a rear seat so as to overlap with the rear seat in plan view; and a fuel tank including a shallow profile portion that is disposed at the lower side of the battery such that a portion thereof overlaps with a floor face of the battery in plan view, and a deep profile portion that is made thicker in the vehicle up-down direction than the shallow profile portion and that is disposed at the rear side of the battery such that at least a portion thereof overlaps with a rear face of the battery in elevational view.

8 Claims, 12 Drawing Sheets

FOREIGN PATENT DOCUMENTS

| | | |
|---|---|---|
| JP | 2004-243885 A | 9/2004 |
| JP | 2005-001405 A | 1/2005 |
| JP | 2005-119347 A | 5/2005 |
| JP | 2006-069340 A | 3/2006 |
| JP | 2007-008443 A | 1/2007 |
| JP | 2008-006904 A | 1/2008 |
| JP | 2009-029159 A | 2/2009 |
| JP | 2009-090952 A | 4/2009 |

\* cited by examiner

VEHICLE STRUCTURE OF A HYBRID VEHICLE

This is a 371 national phase application of PCT/JP2009/061637 filed 25 Jun. 2009, the contents of which are incorporated herein by reference.

TECHNICAL FIELD

The present invention relates to a vehicle structure of a hybrid vehicle including a battery and a fuel tank.

BACKGROUND ART

Technologies are known in which a battery is disposed below a rear seat and a fuel tank is disposed below the battery (for example, see Japanese Patent Application Laid-Open (JP-A) Nos. 2008-006904 and 2004-243885). Further, fuel cell automobiles are known in which a fuel cell is disposed between a pair of hydrogen tanks that are disposed in front and behind in the vehicle (for example, see JP-A No. 2004-196217). Still further, vehicle body structures are known in which a fuel tank disposed below a rear seat includes a shallow profile portion that is disposed under a floor space in front of the rear seat, and a battery is disposed below a front seat (for example, see JP-A No. 2006-69340).

DISCLOSURE OF INVENTION

Technical Problem

However, with a structure in which a battery and a fuel tank are simply superposed above and below, the height of an automobile in which this structure is employed becomes higher. On the other hand, with a structure in which a battery and a fuel tank are simply arranged in front and behind, the front-rear length of an automobile in which this structure is employed becomes longer.

An object of the present invention is to provide a vehicle structure of a hybrid vehicle that contributes to structuring the vehicle more compactly.

Solution to Problem

A vehicle structure of a hybrid vehicle relating to a first aspect of the present invention includes: a battery disposed at a lower side in a vehicle up-down direction of a rear seat such that at least a portion thereof overlaps with the rear seat in a plan view; and a fuel tank including a shallow profile portion that is disposed at the lower side in the vehicle up-down direction relative to a floor face of the battery such that at least a portion thereof overlaps with the battery in plan view, and a deep profile portion that is formed with a higher height in the vehicle up-down direction than the shallow profile portion and that is disposed at a rear side in a vehicle front-rear direction relative to a rear face of the battery such that at least a portion thereof overlaps with the battery in an elevational view.

According to the aspect described above, the fuel tank is disposed with the shallow profile portion thereof at the lower side in the vehicle relative to the floor face of the battery, and the deep profile portion of the fuel tank is disposed to the rear side in the vehicle relative to the rear face of the battery. Therefore, in the present aspect, a more compact arrangement in the up-down direction of the vehicle is possible than in a structure in which the battery and the fuel tank are simply superposed above and below, and a more compact arrangement in the vehicle front-rear direction is possible than in a structure in which the battery and the fuel tank are simply arranged in front and behind. That is, in the present aspect, the battery and the fuel tank may be arranged, in overall, to be more compact in the front to rear and the up to down directions, while maintaining capacities of the battery and fuel tank.

Thus, the hybrid vehicle structure relating to the aspect described above contributes to structuring the vehicle more compactly. Herein, the rear seat of the present invention may be understood as being a seat, of seats that are disposed between front and rear wheels (axles) of the vehicle, that is disposed at a rear wheel side.

In the aspect described above, a structure may be formed that is provided with: a pair of left and right side members that are formed to be long in the vehicle front-rear direction; a first cross member that is formed to be long in a vehicle width direction and spans between the pair of side members; and a second cross member that is formed to be long in the vehicle width direction and spans between the pair of side members at the rear side in the vehicle front-rear direction relative to the first cross member, wherein the battery is disposed so as to be surrounded in plan view by the pair of side members and the first and second cross members.

According to the aspect described above, a rectangular frame is formed by the pair of left and right side members and the front and rear cross members. This frame (at least exterior wall portions thereof) encloses the battery from four sides in plan view. Therefore, the battery is protected against external forces associated with vehicle collisions and the like. In particular, if the structure (arrangement) disperses a load, which is associated with a vehicle impact when there is a side impact on the vehicle, into the front and rear cross members, deformation of the vehicle body (of frame portions including the above-mentioned frame) during the side impact is suppressed and the battery is excellently protected.

In the aspect described above, a structure may be formed in which the second cross member spans between the pair of side members, passing between a rear face of the battery that faces to the rear side in the vehicle front-rear direction and a front face of the deep profile portion of the fuel tank that faces to the front side in the vehicle front-rear direction.

According to the aspect described above, the battery may be excellently protected against side impacts by the above-described frame including the second cross member that is disposed to effectively utilize a space between the battery and the fuel tank.

In the aspects described above, a structure may be formed in which the battery is disposed at the upper side in the vehicle up-down direction relative to the first cross member, such that a front end portion of the battery in the vehicle front-rear direction is disposed within the extent of a width in the vehicle front-rear direction of the first cross member in plan view.

According to the aspect described above, the front end portion of the battery is disposed directly above the first cross member. Therefore, the present aspect contributes to structuring the vehicle body more compactly in the vehicle front-rear direction than a structure in which a front end portion of a battery is disposed rearward in a vehicle relative to a first cross member.

In the aspect described above, a structure may be formed in which the shallow profile portion of the fuel tank is disposed at the rear side in the vehicle front-rear direction relative to the first cross member such that at least a portion thereof overlaps with the first cross member in elevational view.

According to the aspect described above, the shallow profile portion of the fuel tank is disposed to effectively utilize a space behind the first cross member that is disposed downward in the vehicle relative to the battery. Therefore, the present aspect contributes to structuring the vehicle body more compactly in the vehicle up-down direction than a structure in which the shallow profile portion of the fuel tank is disposed downward in the vehicle relative to the first cross member.

In the aspects described above, a structure may be formed that is further provided with a battery protection member that includes: vehicle body fixing portions that are fixed to the first cross member and the second cross member; and a battery protection portion that is disposed at the upper side in the vehicle up-down direction relative to the battery.

According to the aspect described above, the battery is protected against loads from above in the vehicle by the battery protection portion of the battery protection member.

In the aspect described above, a structure may be formed in which the vehicle body fixing portions are fixed to both of vehicle width direction outer sides relative to the battery of at least one of the first cross member and the second cross member.

According to the aspect described above, the battery protection member is fixed to at least one of the first and second cross members at both outer sides in the vehicle width direction relative to the battery. Therefore, a load associated with a side impact load may be dispersed by the battery protection member at the side of the impact relative to the battery, and protection performance of the battery against side impacts is improved.

In the aspects described above, a structure may be formed in which the battery protection member is structured to include a seat frame that structures the rear seat.

According to the aspect described above, the battery may be protected as described above using the seat frame that structures the rear seat.

In the aspects described above, a structure may be formed in which the battery protection member is structured to include a battery case that accommodates the battery.

According to the aspect described above, the battery may be protected as described above using the battery case that accommodates the battery.

In the aspects described above, a structure may be formed in which the battery is fixed to each of the first cross member and the second cross member.

According to the aspect described above, the battery is fixed to both of the first and second cross members. Thus, if, for example, bending arises in the pair of side members in association with a rear impact on the vehicle, the battery moves forward in the vehicle together with the first and second cross members. Therefore, even when the fuel tank moves forward in the vehicle in association with a rear impact of the vehicle, interference between the fuel tank and the battery is prevented or restrained (an impact associated with interference is moderated).

Advantageous Effects of Invention

A hybrid vehicle structure relating to the present invention as described above has an excellent effect in contributing to the vehicle body being compactly structured.

BEST MODE FOR CARRYING OUT THE INVENTION

Figure 1:
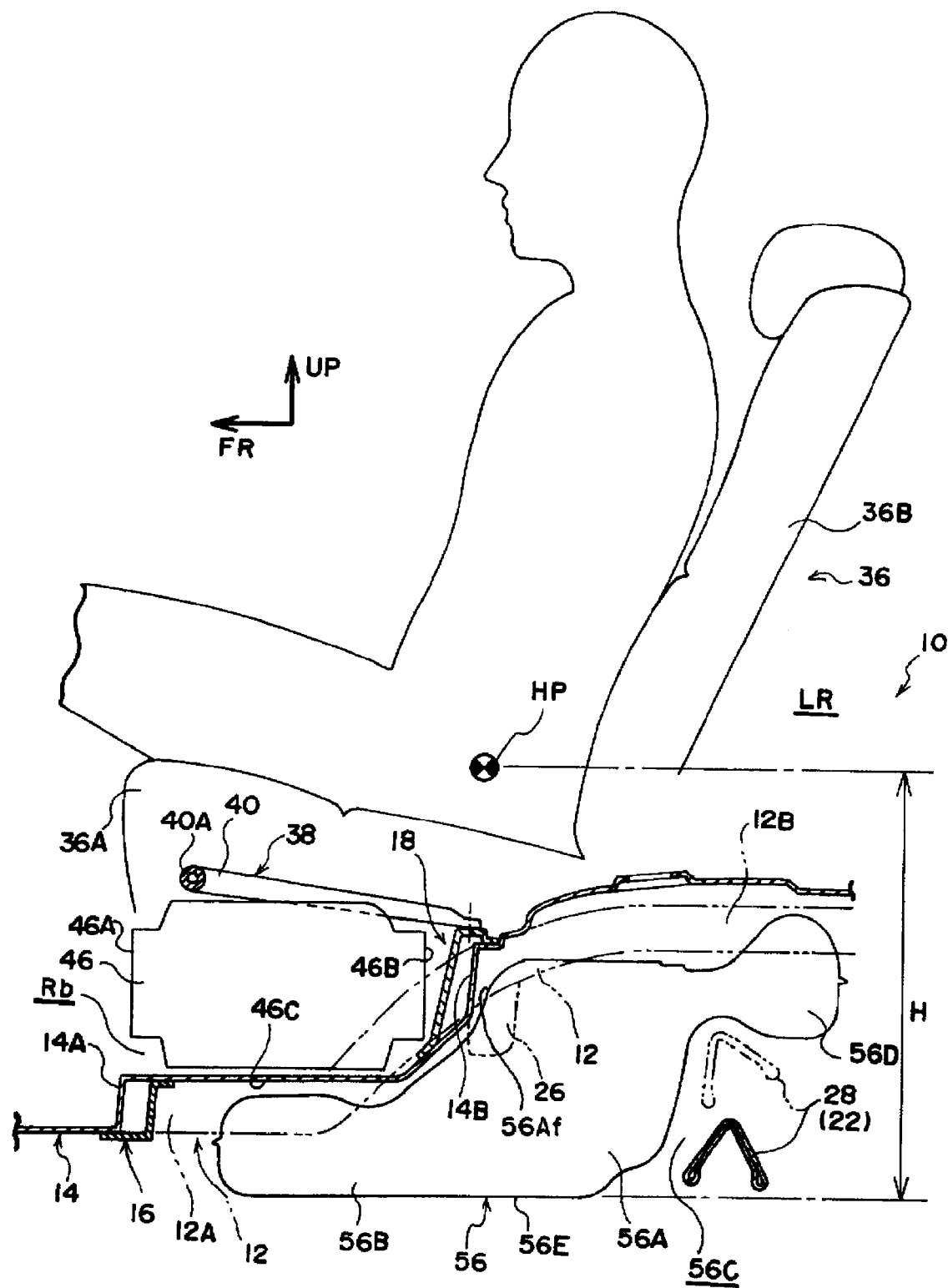
FIG. 1 is a side sectional diagram schematically illustrating a vehicle rear portion structure relating to a first exemplary embodiment of the present invention.

A vehicle rear portion structure 10 of a hybrid vehicle HV, in which a hybrid vehicle's vehicle structure relating to a first exemplary embodiment of the present invention is employed, is described in accordance with FIG. 1 to FIG. 8. First, structure of a vehicle body rear portion constituting the vehicle rear portion structure 10 is described. Then, a mounting structure of a battery 46 and the shape and disposition of a fuel tank 56 are described. Herein, the arrow FR that is marked as appropriate in the drawings indicates a forward direction in the vehicle front-rear direction, an arrow UP indicates an upward direction in the vehicle up-down direction, an arrow LH indicates a vehicle left side, which is one side in a vehicle width direction, and an arrow RH indicates a vehicle right side, which is one side in the vehicle width direction, respectively. Where the front/rear and up/down directions are used in the following descriptions, these are based on the front-rear direction and the up-down direction of the vehicle.

—Structure of Vehicle Body Rear Portion—

Figure 2:
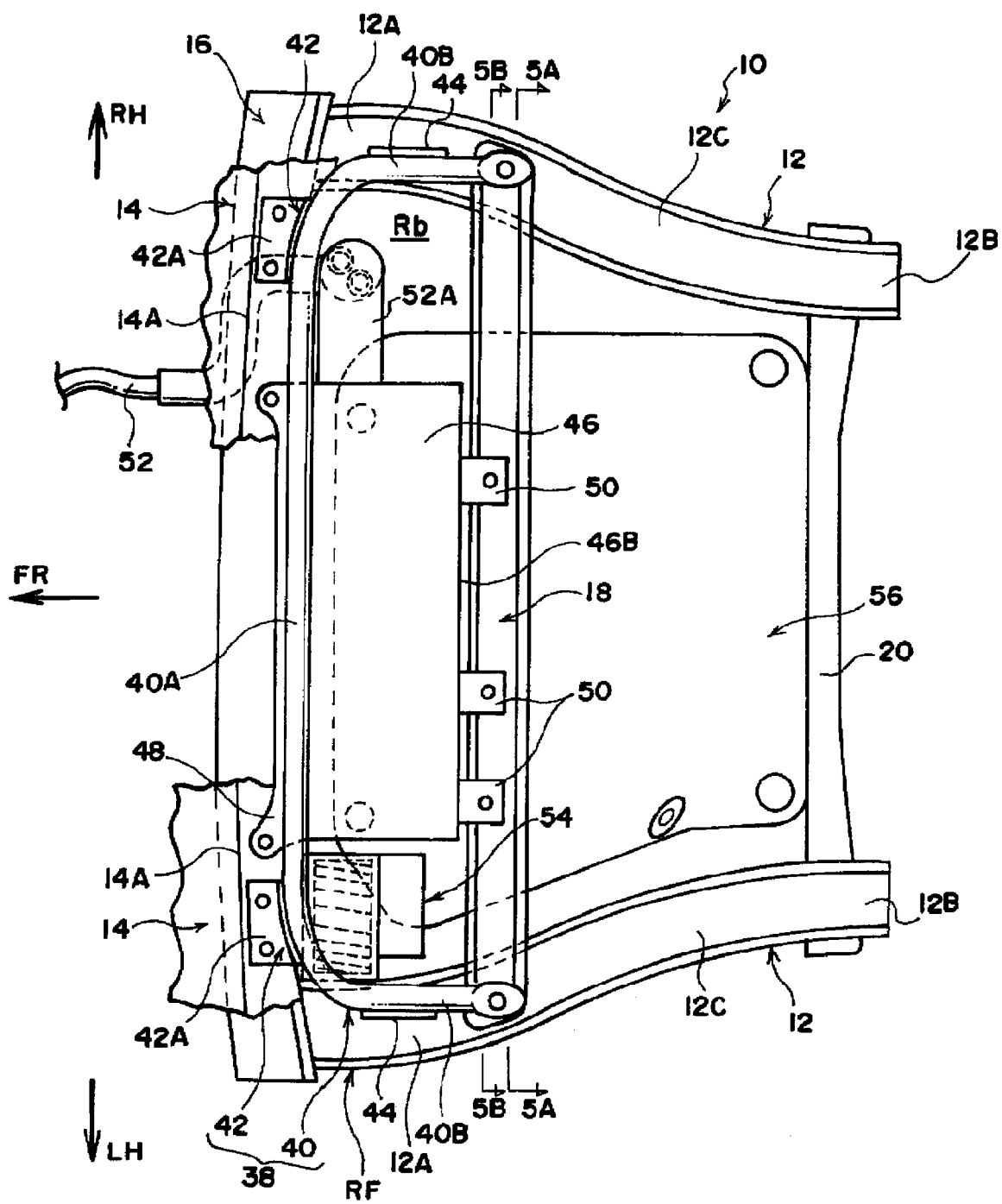
FIG. 2 is a plan view schematically illustrating the vehicle rear portion structure relating to the first exemplary embodiment of the present invention.
Figure 3:
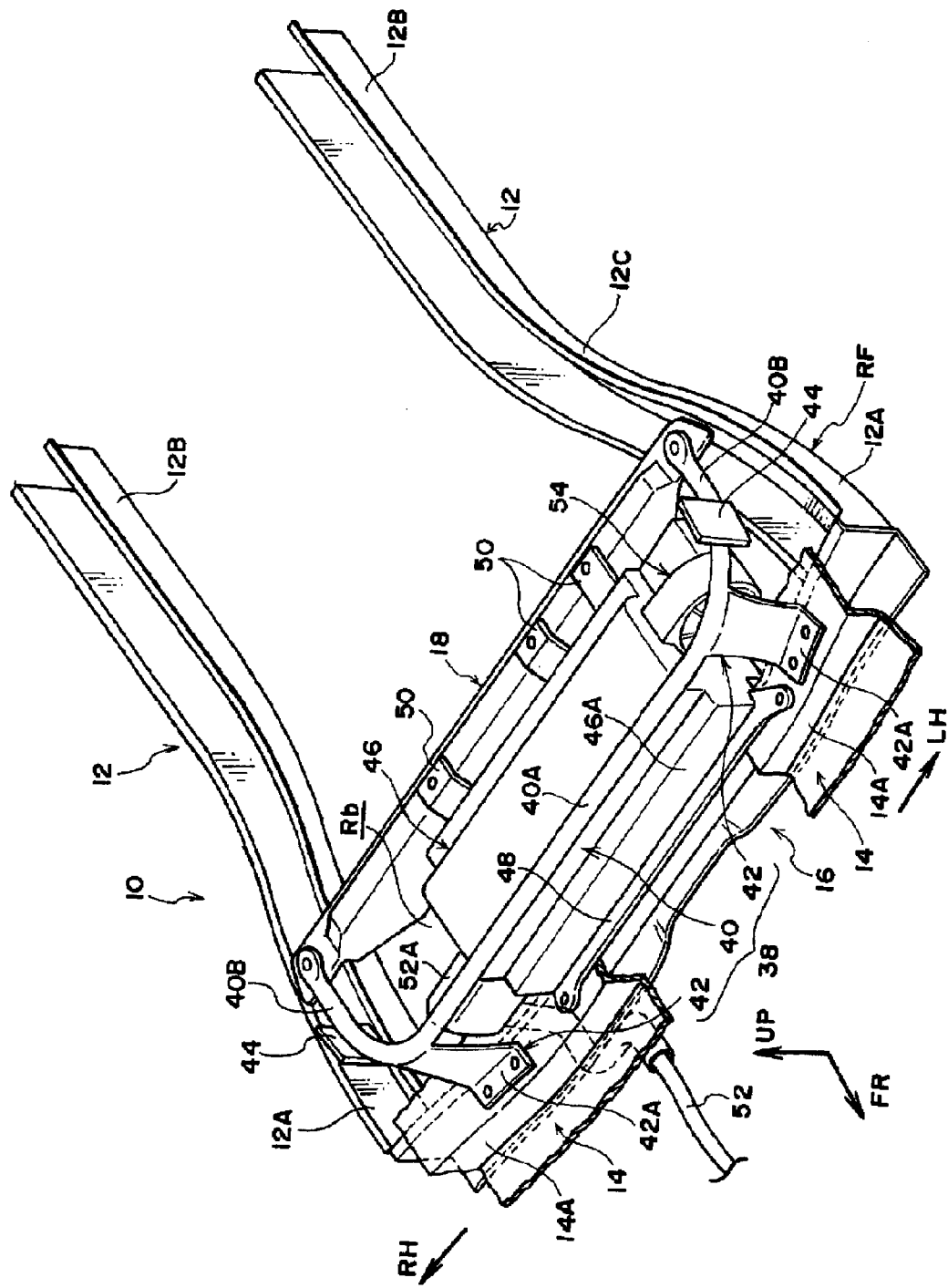
FIG. 3 is a perspective view schematically illustrating the vehicle rear portion structure relating to the first exemplary embodiment of the present invention.

In FIG. 2, general overall structure of the vehicle rear portion structure 10 is illustrated in a plan view. In FIG. 3, the general overall structure of the vehicle rear portion structure 10 is illustrated in a perspective view. As illustrated in these drawings, the vehicle body that constitutes the vehicle rear portion structure 10 includes rear side members 12 that serve as a pair of left and right side members. The left and right rear side members 12 are both frames with their longer sides extending in the vehicle front-rear direction.

Specifically, each rear side member 12 is formed with a cross-section in a hat shape that opens upward. The rear side member 12 is joined to a floor panel 14 from a lower face side thereof, and thus forms a closed cross-section frame structure with the floor panel 14. In FIG. 2 and FIG. 3, only a portion of the floor panel 14 is illustrated (a portion of a region at which a center cross member 16, which is described later, is formed). The rear side member 12 is not limited to a structure that opens upward, and may be, for example, a structure in which a closed cross-section frame structure is formed by joining an inner panel that opens outward in the vehicle width direction to an outer panel. In such a structure, the floor panel may be joined to an upper wall of the inner panel.

Each rear side member 12 has a rear portion 12B disposed at the vehicle width direction inner side and the upper side relative to a front portion 12A. The front portion 12A and rear portion 12B, which each extend in the vehicle front-rear direction, are smoothly coupled by a kick portion 12C. Front end portions of the rear side members 12 are coupled to different end portions in the vehicle width direction of the center cross member 16, which serves as a first cross member that is formed to be long in the vehicle width direction. In other words, the front end portions of the rear side members 12 are spanned between by the center cross member 16.

As illustrated in FIG. 1, the center cross member 16 forms a frame structure with a closed cross-section with the floor panel 14 (a step portion 14A), by being joined to the floor panel 14 from the lower face side thereof so as to straddle the step portion 14A that is formed at the floor panel 14. A front end portion of each rear side member 12 and both of vehicle width direction end portions of the center cross member 16 are coupled to a rear end portion of a rocker, which is an unillustrated vehicle body frame. The center cross member 16 may be structured as a closed cross-section frame separate from the floor panel 14, by a cross member lower being joined with a cross member upper. In this case, for example, a structure may be employed in which a cross member formed with substantial point symmetry about the center of the closed cross-section is joined to a cross member with a similar closed cross-sectional form to the center cross member 16 illustrated in FIG. 1. The floor panel 14 may have a structure with two divisions, in front of and behind the center cross member 16.

As illustrated in FIG. 2 and FIG. 3, the kick portions 12C of the rear side members 12 are spanned between by a rear cross member 18 that serves as a second cross member. As is also illustrated in FIG. 1, the rear cross member 18 spans between substantially central portions in the front-rear direction of the left and right kick portions 12C. In this exemplary embodiment, the two ends in the vehicle width direction of the rear cross member 18 are fixed by fastening to upper faces of the kick portions 12C.

Figure 5A:
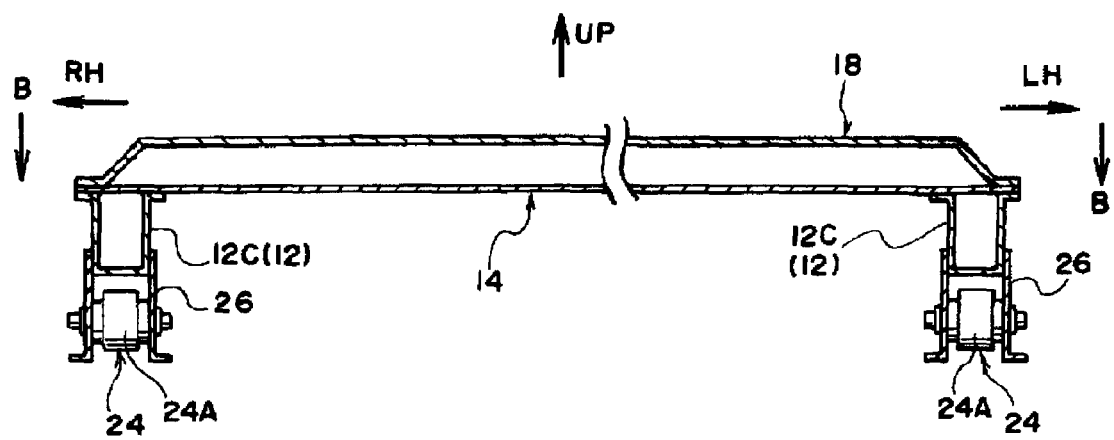
FIG. 5A is a sectional diagram taken along 5A-5A of FIG. 2.
Figure 5B:
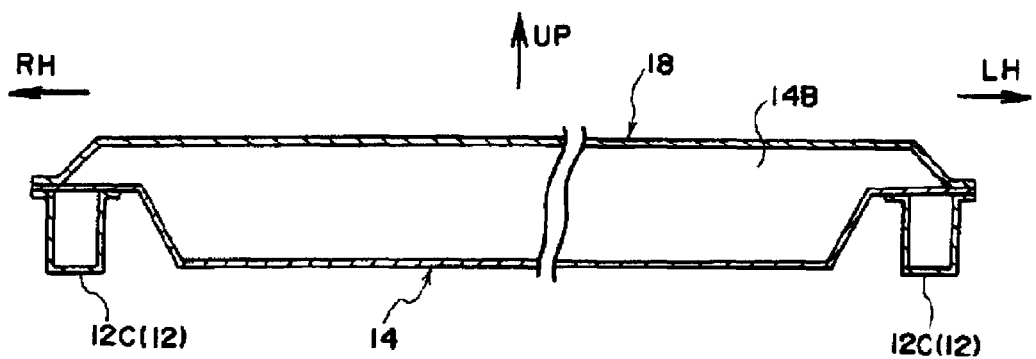
FIG. 5B is a sectional diagram taken along 5B-5B of FIG. 2.

As illustrated in FIG. 1, the rear cross member 18 is joined to the floor panel 14 from an upper face side thereof, so as to straddle a step portion 14B in the floor panel 14 that is formed behind the center cross member 16. Thus, the rear cross member 18 forms a frame structure with a closed cross-section with the floor panel 14 (the step portion 14B). In this exemplary embodiment, the rear cross member 18 forms the closed cross-section to be narrow in the up-down direction to rearward of the step portion 14B, as illustrated in FIG. 5A, and forms the closed cross-section to be wide in the up-down direction forward of the step portion 14B, as illustrated in FIG. 5B. An upper face of the rear cross member 18 is disposed at the upper side relative to the upper face of (the floor panel 14 structuring) the center cross member 16.

Figure 4:
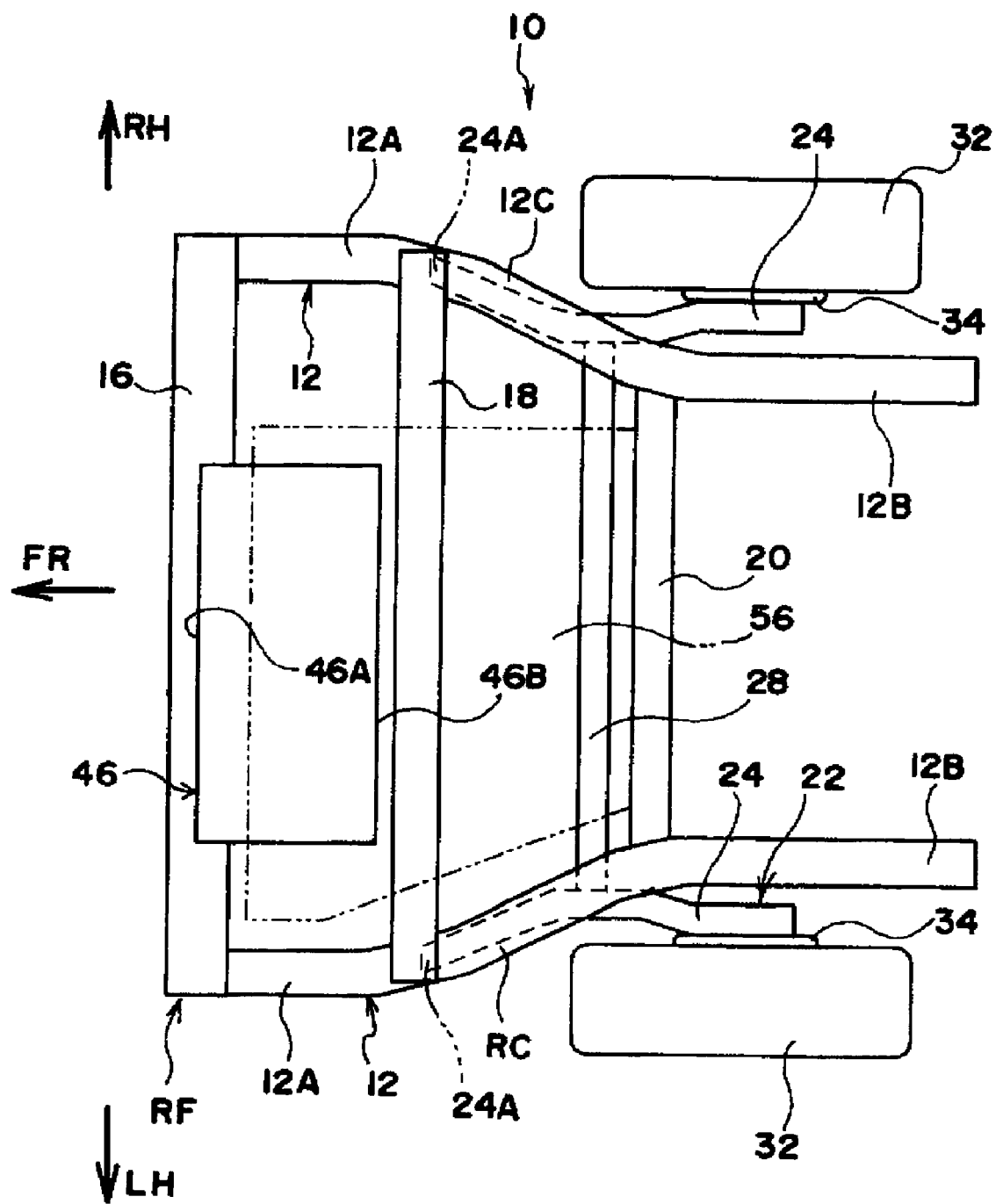
FIG. 4 is a plan view schematically illustrating a rear portion of an automobile in which the vehicle rear portion structure relating to the first exemplary embodiment of the present invention is employed.

In this exemplary embodiment, as illustrated in FIG. 2 and FIG. 4, the vehicle body constituting the vehicle rear portion structure 10 is provided with a center cross member 20 that spans between the rear ends of the left and right kick portions 12C (vicinities of boundary portions thereof with the rear portions 12B). As illustrated in FIG. 4, front ends 24A of trailing arms 24 that structure a rear suspension 22 are swingably supported at the kick portions 12C of the left and right rear side members 12.

Figure 6:
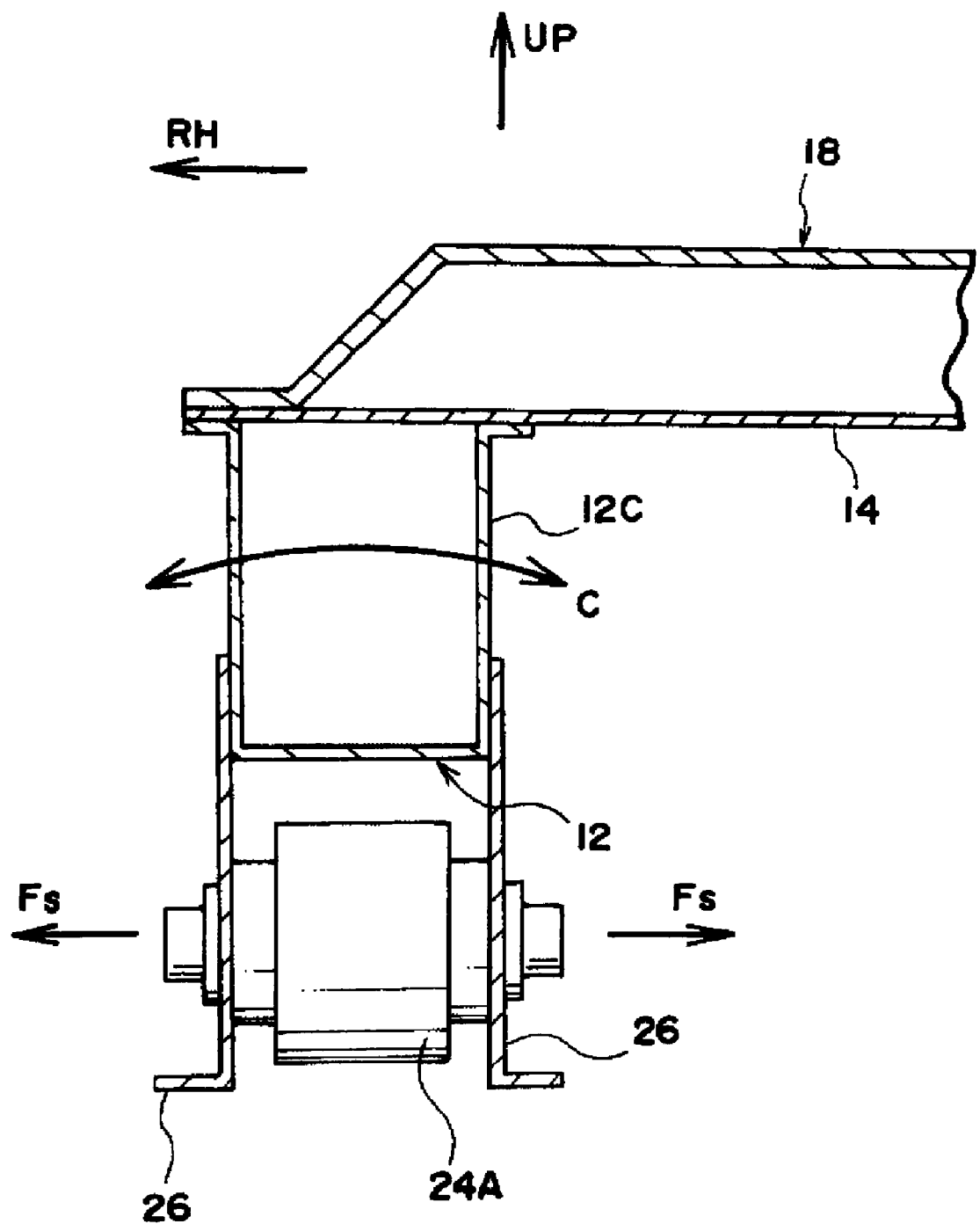
FIG. 6 is an elevational sectional diagram illustrating in magnification a support portion of a rear suspension of the automobile in which the vehicle rear portion structure relating to the first exemplary embodiment of the present invention is employed.

Specifically, as illustrated in FIG. 5A and FIG. 6, brackets 26 that support the front ends 24A of the trailing arms 24 are fixed to the left and right rear side members 12 below regions of coupling with the rear cross member 18 (mainly a portion rearward of the step portion 14B). Intermediate portions of the left and right trailing arms 24 are spanned between by an intermediate beam 28. Hubs 34 of rear wheels 32 are rotatably supported at rear ends of the left and right trailing arms 24 via respective axle brackets (not illustrated).

Further, at the vehicle rear portion structure 10, a rear seat 36 is provided at the upper side of the step portions 14A and 14B of the floor panel 14. The rear seat 36 includes a seat cushion 36A, on which an occupant P sits, and a seat back 36B, whose lower end is coupled to a rear end of the seat cushion 36A. In the hybrid automobile HV relating to this exemplary embodiment, a space behind the seat back 36B serves as a luggage compartment LR. A position of a front end of the seat cushion 36A substantially coincides with a position in the front-rear direction of the center cross member 16, and a position of the rear end of the seat cushion 36A is disposed at the rear side relative to the rear cross member 18.

The seat cushion 36A is structured by covering a seat frame 38 thereof with an unillustrated cushion material (a pad) and a skin. As illustrated in FIG. 2 and FIG. 3, the seat frame 38 includes a frame main body 40 that serves as a battery protection portion, which is overall formed to be long in the vehicle width direction. The frame main body 40 includes a front frame 40A, which extends along the vehicle width direction, and a pair of left and right side frames 40B, which protrude rearward in the front-rear direction from both of vehicle width direction end portions of the front frame 40A.

The frame main body 40 is fixed, at the rear ends of the side frames 40B, by being fastened to vehicle width direction end portions of the rear cross member 18 (regions of coupling thereof with the rear side members 12). As fasteners for this fastening, unillustrated nuts and bolts are used in this exemplary embodiment. In the state of being fixed to the vehicle body, the front frame 40A is disposed at a position that, in plan view, is directly above the center cross member 16 or slightly offset to the rear side from the center cross member 16.

The seat frame 38 includes a pair of left and right leg portions 42 that serve as vehicle body fixing portions, which are respectively provided at the two vehicle width direction end vicinities of the front frame 40A. Respective upper end portions of the leg portions 42 are coupled to the front frame 40A, and respective lower end portions of the same are formed as flanges 42A. The leg portions 42 are fixed by fastening of these flanges 42A in the vicinity of two end portions, in the vehicle width direction, of the center cross member 16 (and the floor panel 14 forming the closed cross section therewith). As fasteners for this fastening, unillustrated nuts and bolts are used in this exemplary embodiment.

According to the above, the seat frame 38 is fixed by fastening directly to both of the center cross member 16 and the rear cross member 18. Herein, the seat frame 38 may be indirectly fixed, via a bracket or the like, to each of the center cross member 16 and the rear cross member 18.

In this exemplary embodiment, load-bearing plates 44, respectively facing outward in the vehicle width direction, are provided at the left and right side frames 40B of the seat frame 38. Note that a structure in which the load-bearing plates 44 are not provided may be employed in a vehicle (model), if certain required side impact characteristics are maintained. In this exemplary embodiment, the seat frame 38 corresponds to a battery protection member of the present invention, and is configured to function as a load-dispersing member for dispersing (spreading support of) a side impact load of the hybrid automobile in which it is employed.

—Battery Mounting Structure—

As illustrated in FIG. 1 to FIG. 3, the battery 46 is mounted at the lower side of the seat cushion 36A structuring the rear seat 36. The battery 46 is a storage battery that stores electrical energy for driving an unillustrated electric motor for running the hybrid automobile HV. Although not illustrated in the drawings, the battery 46 is structured to accommodate a battery main body in a battery case.

In this exemplary embodiment, the battery 46 is disposed between the seat frame 38 and the floor panel 14 (the upper side of the floor panel 14). In plan view, substantially the whole of the battery 46 is disposed to overlap with the seat cushion 36A. More specifically, a front face 46A of the battery 46 is disposed directly above the center cross member 16 and a rear face 46B thereof is disposed directly in front of the rear cross member 18 (the step portion 14B of the floor panel 14). Thus, in the vehicle rear portion structure 10, as illustrated in FIG. 2, it is structured to be surrounded from four sides in plan view by (the outer side walls of) a rectangular frame RF that is formed by the left and right rear side members 12, the center cross member 16 and the rear cross member 18.

As illustrated in FIG. 1, the battery 46 is disposed at the lower side of the frame main body 40 structuring the seat frame 38. The front frame 40A of the frame main body 40 is disposed directly above a front portion of the battery 46. Furthermore, as illustrated in FIG. 2 and FIG. 3, the battery 46 is disposed between the pair of left and right leg portions 42 structuring the seat frame 38 in the vehicle width direction. That is, the seat frame 38 is fixed by fastening to each of the center cross member 16 and the rear cross member 18 at both outer sides of each in the vehicle width direction relative to the battery 46.

According to the above, in the vehicle rear portion structure 10, the battery 46 is disposed in a battery accommodation space Rb surrounded by the above-described rectangular frame RF and the seat frame 38. This battery 46 is configured to be disposed as far forward and upward as possible in the vehicle, while maintaining leg space for the occupant P and the thickness of the cushion material structuring the rear seat 36. This is described below in association with operations of the present exemplary embodiment.

The battery 46 described above is fixed to each of the center cross member 16 and the rear cross member 18. Specifically, as illustrated in FIG. 2 and FIG. 3, the lower end side of the front end side of the battery 46 is fixed by fastening to the center cross member 16 via brackets 48 at both end portions, in the vehicle width direction, of the center cross member 16. In the example illustrated in FIG. 2 and FIG. 3, the brackets 48 are fastened to the upper face of the center cross member 16, but a structure may be formed in which, for example, the brackets 48 are fastened to the front face of the center cross member 16. The upper end side of the rear end side of the battery 46 is fixed by fastening to the rear cross member 18 via brackets 50 at a plural locations (three locations in this exemplary embodiment) spaced in the vehicle width direction. As fasteners for this fastening, unillustrated nuts and bolts are used in this exemplary embodiment.

As illustrated in FIG. 2 and FIG. 3, in the vehicle rear portion structure 10, a high-voltage cable 52 is provided for connecting the battery 46 with the electric motor and an inverter and the like. The high-voltage cable 52 in this exemplary embodiment is connected to the battery 46 at the right side (one side in the vehicle width direction) of the battery 46 in the battery accommodation space Rb. That is, a connection location 52A between the battery 46 and the high-voltage cable 52 is disposed inside the battery accommodation space Rb. The high-voltage cable 52 is guided beneath the floor through the floor panel 14 that forms a floor face of the accommodation space Rb, and is guided to the electric motor, inverter and the like, which are disposed to the front side.

As illustrated in FIG. 2 and FIG. 3, in the vehicle rear portion structure 10, a cooling fan unit (a fan motor) 54 for cooling the battery 46 is disposed in the accommodation space Rb. The cooling fan unit 54 is formed as a centrifugal fan that blows air flowing in from the front side at the battery 46 along the vehicle width direction. In this exemplary embodiment, the cooling fan unit 54 is disposed in the accommodation space Rb at the left side of the battery 46 (the opposite side from the side at which the high-voltage cable 52 is disposed).

—Shape and Disposition of Fuel Tank—

In the vehicle rear portion structure 10, the fuel tank 56 is disposed at the lower side relative to the floor panel 14 and the lower side relative to the rear seat 36. The fuel tank 56 stores liquid fuel to be supplied to an unillustrated internal combustion engine; for example, gasoline, diesel oil or the like. The internal combustion engine fulfils the functions of at least one of generating motive power for the hybrid automobile HV and charging up the battery 46.

The fuel tank 56 is structured to include a deep profile portion (a general portion) 56A, which is disposed at the rear side relative to the battery 46, and a shallow profile portion 56B, which protrudes forward from a lower end portion of the deep profile portion 56A. The fuel tank 56 is disposed close to the floor panel 14. That is, the fuel tank 56 is structured to include the shallow profile portion 56B that has a relatively small height in the vehicle up-down direction and the deep profile portion 56A that has a large height in the vehicle up-down direction compared to the shallow profile portion 56B. The deep profile portion 56A is disposed with an upper portion of the front end thereof overlapping with a rear face 46B of the battery 46 (the rear cross member 18) in elevational view. In this exemplary embodiment, as illustrated in FIG. 1, the rear cross member 18 spans between the left and right rear side members 12 by passing through a space between the rear face 46B of the battery 46 and a front face 56Af of the upper portion of the deep profile portion 56A, which faces forward in the vehicle front-rear direction.

Meanwhile, the shallow profile portion 56B is disposed at the lower side of the battery 46. More specifically, the shallow profile portion 56B is disposed to overlap with a lower face 46C of the battery 46 in plan view. Furthermore, the shallow profile portion 56B is disposed with an upper portion thereof overlapped with the center cross member 16 in elevational view.

As illustrated in FIG. 2, a rear end of the fuel tank 56 reaches (a vicinity of) the center cross member 20. This fuel tank 56 is supported at the vehicle body via an unillustrated support structure. For this support structure, for example, direct fastening to the vehicle or indirect fastening via brackets or the like, or suspended support by tank bands or the like, or suchlike may be employed. In this exemplary embodiment, the fuel tank 56 is supported (fixed) by being fastened to the vehicle body in a state in which antivibration rubbers are interposed between the fuel tank 56 and the vehicle body.

In this exemplary embodiment, the fuel tank 56 is disposed to be surrounded by the left and right rear side members 12, the center cross member 16 and the center cross member 20 in plan view. Further, in this exemplary embodiment, a beam escape portion 56C that allows vertical movements of the intermediate beam 28 of the rear suspension 22 is formed in the fuel tank 56 rearward of the deep profile portion 56A. The intermediate beam 28 displaces (swings) at the beam escape portion 56C between the position shown by solid lines in FIG. 1 and the position shown by two-dot chain lines. In this exemplary embodiment, the fuel tank 56 includes a rear portion 56D that is disposed upward and rearward of the beam escape portion 56C.

Next, operation of the first exemplary embodiment is described.

In the vehicle rear portion structure 10 with the structure described above, the battery 46 is disposed below the rear seat 36, the deep profile portion 56A (main body) of the fuel tank 56 is disposed behind the battery 46, and the deep profile portion 56A of the fuel tank 56 is disposed below the battery 46.

Thus, in the vehicle rear portion structure 10, because the fuel tank 56 includes the deep profile portion 56A that is disposed rearward of the battery 46 and the shallow profile portion 56B that is disposed at the lower side of the battery 46, this contributes to structuring the hybrid automobile HV in which the vehicle rear portion structure 10 is employed more compactly front to rear and up to down. This is described by comparison with the comparative examples illustrated in FIG. 12 and FIG. 13.

Figure 12:
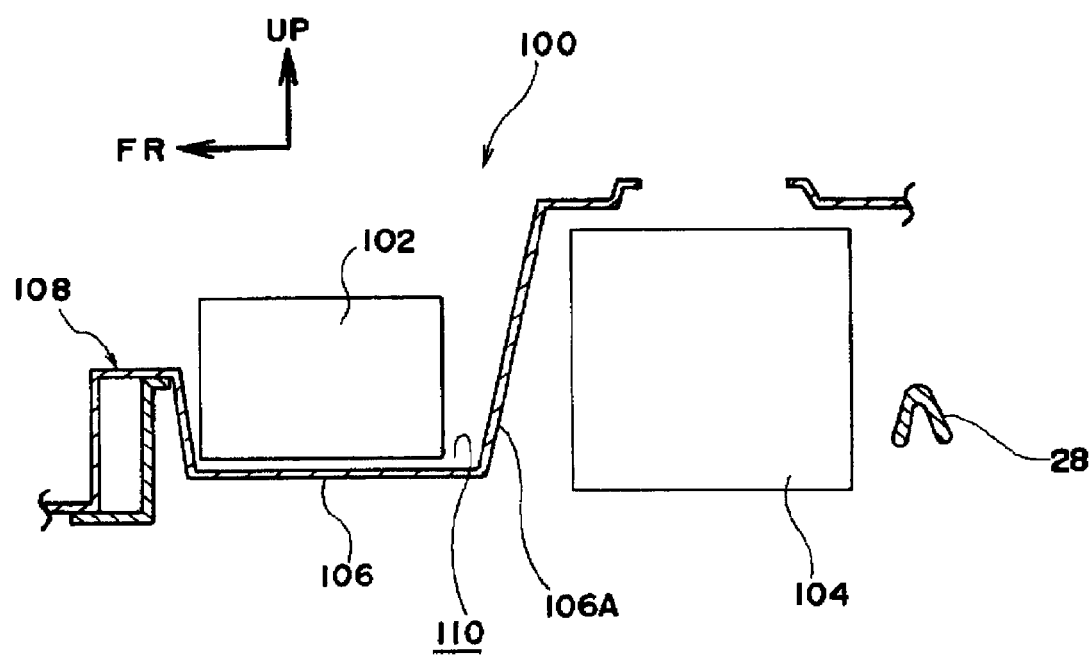
FIG. 12 is a side sectional diagram schematically illustrating a vehicle rear portion structure relating to a first comparative example with the exemplary embodiments of the present invention.

In FIG. 12, a vehicle rear portion structure 100 relating to a first comparative example is illustrated, in which a battery 102 and a fuel tank 104 are lined up to sandwich a step portion 106A of a floor panel 106 from front and behind. In this vehicle rear portion structure 100, the rear cross member 18 is not present but a center cross member 108 has a cross-sectional shape that is higher in the up-down direction than the center cross member 16 in order to assure a required vehicle body rigidity and strength. Accordingly, a battery accommodation recess portion 110 is formed recessed into the floor panel 106 behind the center cross member 108, and the battery 102 is disposed in the battery accommodation recess portion 110, which is to say, rearward of the center cross member 108. The fuel tank 104, which does not include a fuel storage portion corresponding to the shallow profile portion 56B, is formed with a longer front-rear length than the deep profile portion 56A of the fuel tank 56, in order to assure a required capacity. The battery 102 has substantially the same dimensions and shape as the battery 46.

In the vehicle rear portion structure 100 relating to the first comparative example, the battery 102 and the fuel tank 104 are disposed in front and behind, to forward of the rear wheels 32. Consequently, the wheelbase of the hybrid automobile HV in which the vehicle rear portion structure 100 is employed is longer. That is, the vehicle body of the hybrid automobile HV is longer front to rear.

In contrast, in the vehicle rear portion structure 10, the shallow profile portion 56B of the fuel tank 56 is disposed below the battery 46. Therefore, the front-rear length of the deep profile portion 56A of the fuel tank 56 that is disposed behind the battery 46 may be made shorter than the fuel tank 104 while maintaining a required capacity of the fuel tank 56. Moreover, in the vehicle rear portion structure 10, because the rear cross member 18 is provided, the cross-section of the center cross member 16 may be set to be smaller up to down. Thus, in the vehicle rear portion structure 10, the battery 46 may be disposed directly above the center cross member 16, that is, the front end portion of the battery 46 may be disposed within the extent of the front-rear width of the center cross member 16. Therefore, the battery 46 may be disposed further forward than the battery 102 of the vehicle rear portion structure 100.

According to the above, in the vehicle rear portion structure 10 relating to the first exemplary embodiment, in comparison with the vehicle rear portion structure 100 relating to the first comparative example, the wheelbase may be made shorter, contributing to a reduction in size in the front-rear direction of the hybrid automobile HV.

Figure 13:
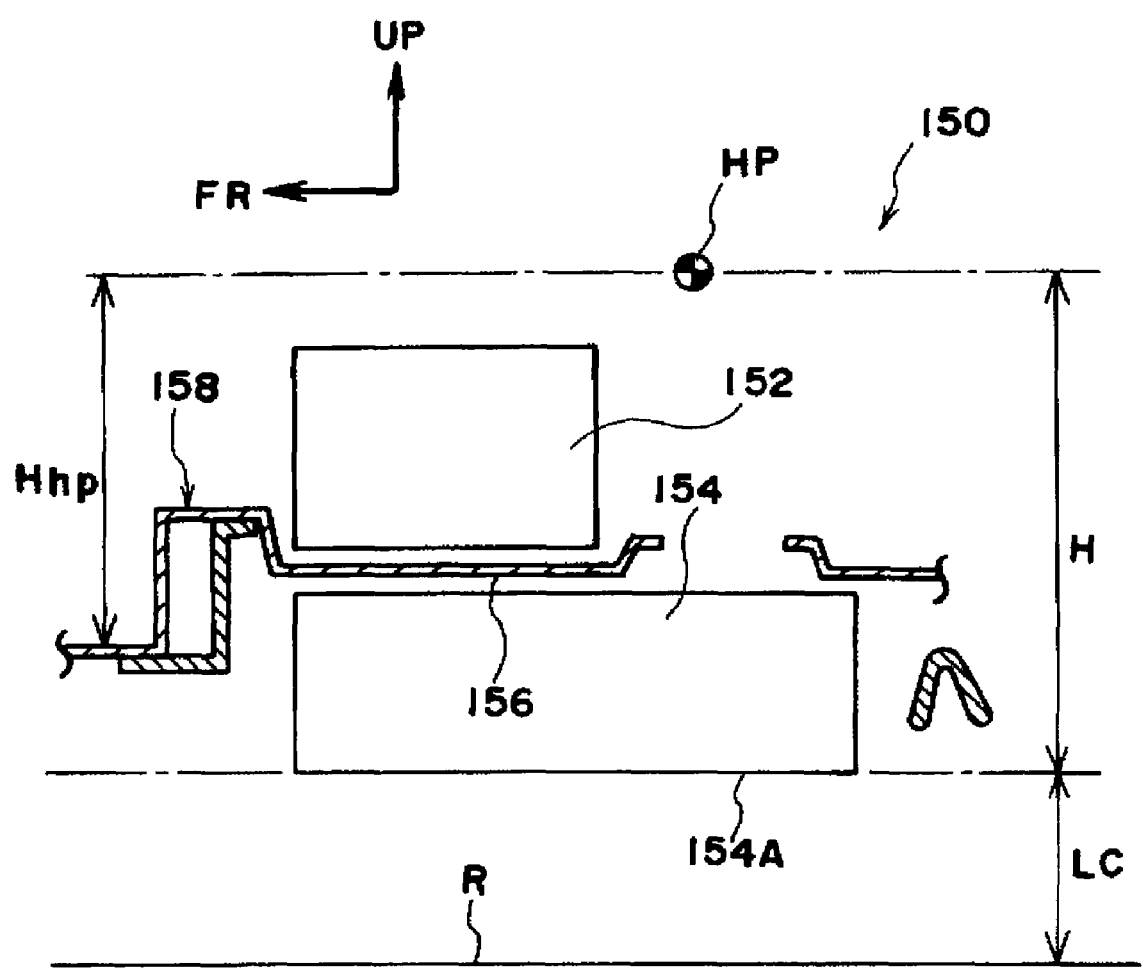
FIG. 13 is a side sectional diagram schematically illustrating a vehicle rear portion structure relating to a second comparative example with the exemplary embodiments of the present invention.

In FIG. 13, a vehicle rear portion structure 150 relating to a second comparative example is illustrated, in which a battery 152 and a fuel tank 154 are lined up to sandwich a floor panel 156 from above and below. In this vehicle rear portion structure 150, the rear cross member 18 is not present but a center cross member 158 has a cross-sectional shape that is higher in the up-down direction than the center cross member 16 in order to assure a required vehicle body rigidity and strength. In the vehicle rear portion structure 150, the battery 152, which has the same dimensions and shape as the battery 46, is disposed on top of the floor panel 156 at the back side of the center cross member 158. Further, in the vehicle rear portion structure 150, the fuel tank 154 has a front-rear length the same as the front-rear length of the fuel tank 56 (excluding the rear portion 56D), and is formed with a vertical height larger than a vertical height of the shallow profile portion 56B, in order to assure a required capacity.

In the vehicle rear portion structure 150 relating to the second comparative example, because the battery 152 and the fuel tank 154 are disposed in line above and below, a height H between a hip point HP of a rear seat occupant and a lower face 154A of the fuel tank 154 is relatively large. Therefore, in the vehicle rear portion structure 150, a height Hhp of the hip point HP from a floor face is higher. Therefore, if a roof is moved upward in order to assure a head clearance that has been reduced accordingly, the vehicle height of the hybrid automobile HV in which the vehicle rear portion structure 150 is employed becomes higher. Alternatively, if, for example, the floor panel 156 behind the center cross member 158 is moved downward and the height Hhp of the hip point HP is kept low, the fuel tank 154 is moved relatively downward. With this structure, in order to assure a minimum above-ground height LC from a road surface R to the lower face 154A of the fuel tank 154, the vehicle height of the hybrid automobile HV becomes higher anyway.

In contrast, in the vehicle rear portion structure 10, the (flat) shallow profile portion 56B of the fuel tank 56 that is thinner than the fuel tank 154 is disposed below the battery 46. Therefore, the height H from a lower face 56E of the fuel tank 56 to the hip point HP at the rear seat 36 may be kept low while assuring a required capacity of the fuel tank 56. In the vehicle rear portion structure 10, the shallow profile portion 56B is disposed so as to overlap with the center cross member 16 in elevational view. That is, the shallow profile portion 56B of the fuel tank 56 is disposed to utilize the space behind the center cross member 16 above which (the front portion of) the battery 46 is disposed. Thus, in the vehicle rear portion structure 10, with the structure in which the battery 46 is disposed directly above the center cross member 16, the above-mentioned height H, which is to say the hip point HP of the rear seat occupant, may be set lower.

According to the above, in the vehicle rear portion structure 10 relating to the first exemplary embodiment, the vehicle height may be made low in comparison with the vehicle rear portion structure 150 relating to the second exemplary embodiment, contributing to a reduction in size in the up-down direction of the hybrid automobile HV.

The vehicle rear portion structure 10 contributes to a reduction in weight and a reduction in fuel consumption of the hybrid automobile HV in which it is employed, by reducing the size in the aforementioned front-rear direction and reducing the size in the up-down direction. That is, in a model (hybrid automobile HV) with a relatively low vehicle height, such as a sedan, a station wagon, a hatchback or the like, the vehicle rear portion structure 10 may meet assurances of required capacity of the fuel tank and assurances of comfort. In particular, with a compact car whose front-rear direction length is relatively short, a practical package (layout of components and the like) may be realized while assuring a required capacity of the fuel tank and assuring comfort. Moreover, in the vehicle rear portion structure 10, because the battery 46 is not mounted at the luggage compartment LR, assurances of luggage compartment capacity and efficient use of luggage space (including arrangements of seats and the like) may be enabled.

In the vehicle rear portion structure 10, the battery 46 is surrounded by the rectangular frame RF in plan view. Therefore, if an impact on the hybrid automobile HV in which the vehicle rear portion structure 10 is employed occurs, an impact load acting directly on the battery 46 is suppressed and the battery 46 is excellently protected.

Figure 7:
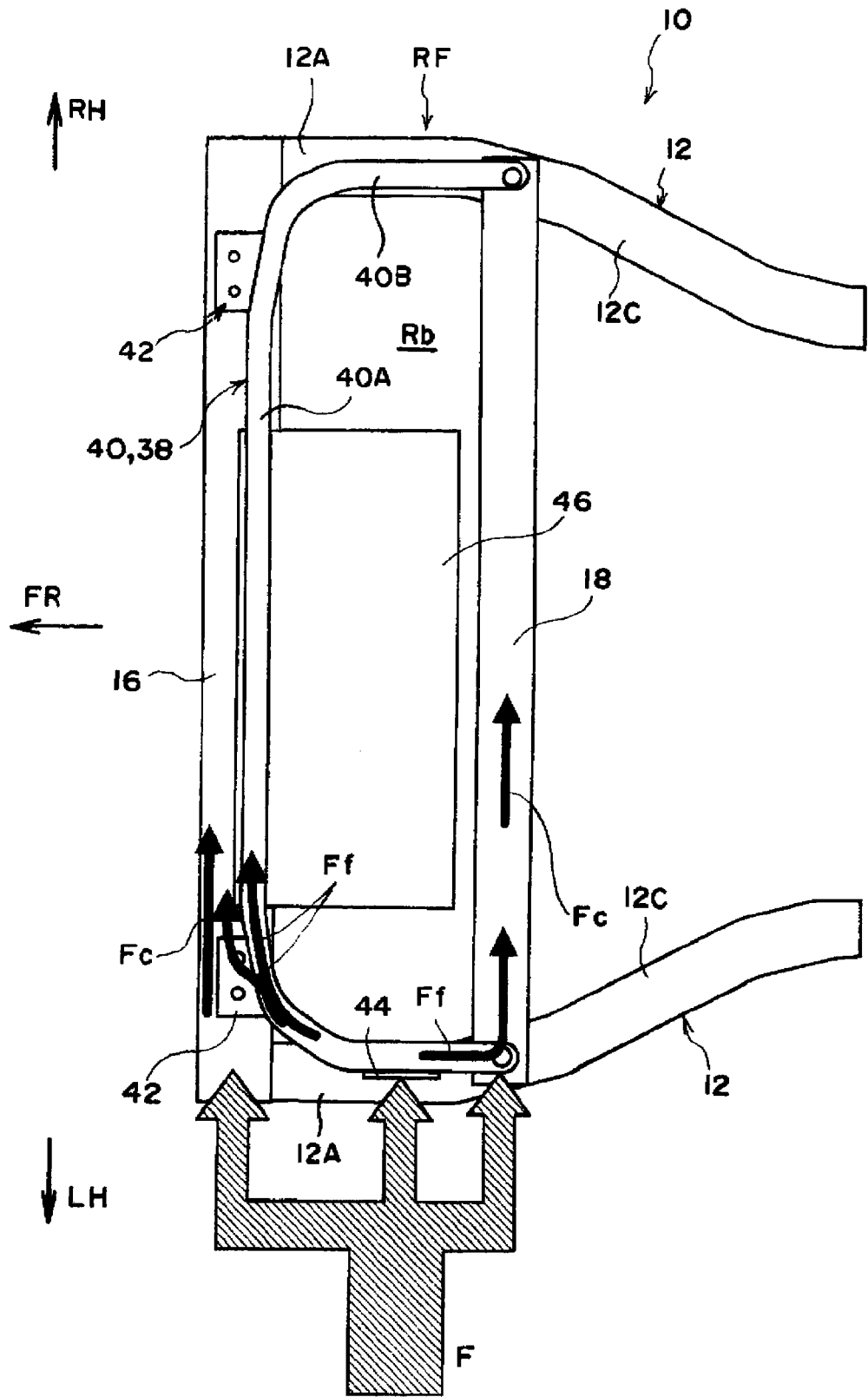
FIG. 7 is a plan view illustrating a state in which a side impact load is dispersed in the vehicle rear portion structure relating to the first exemplary embodiment of the present invention.

In particular, because the center cross member 16 and the rear cross member 18 are disposed in front of and behind the battery 46, the battery 46 is excellently protected against a side impact of the hybrid automobile HV. That is, if, for example, a pole or the like impacts in the vicinity of the rear seat 36 (if the load is inputted locally), then as illustrated in FIG. 7, a side impact load F is dispersed into the center cross member 16 and the rear cross member 18 (see arrows Fc). Because of this dispersal of a side impact load (propagation to the opposite side from the impact) in accordance with the efficient arrangement of the center cross member 16 and the rear cross member 18, side impact body deformations at both the front and rear sides of the battery 46 are suppressed, and the battery 46 is excellently protected as mentioned above.

Further, in the vehicle rear portion structure 10, the seat frame 38 is fixed by fastening to the center cross member 16 and the rear cross member 18. Therefore, an input load associated with a side impact on the hybrid automobile HV is supported by the seat frame 38, and therefore the battery 46 is protected against side impacts. In particular, in this exemplary embodiment, because the load-bearing plates 44 are provided at the seat frame 38, the protection performance of the battery 46 is improved by the seat frame 38 supporting (bearing) a side impact load. Further, a side impact load (including a load that is inputted to the rectangular frame RF and a load that is inputted to the seat frame 38) is also dispersed into the frame main body 40, at the vehicle width direction outer side relative to the battery 46 as illustrated in FIG. 7 (see arrow Ff) and is propagated to the opposite side from the impact. Thus, the protection performance of the battery 46 is also improved by the above-described load dispersion. In particular, in the vehicle rear portion structure 10, because the load-bearing plates 44 are provided, a load that is dispersed and supported by the seat frame 38 may be larger than in a structure that does not include the load-bearing plates 44.

In the vehicle rear portion structure 10, in association with the above-described improvements in the protection performance of the battery 46 against side impacts, the protection performance of seat occupants P against side impacts is also improved. Further, in the vehicle rear portion structure 10, because the rear cross member 18 is disposed between the rear face 46B of the battery 46 and the front face 56Af of the deep profile portion 56A of the fuel tank 56, protection performance of the fuel tank 56 against side impacts is improved in comparison with the vehicle rear portion structures 100 and 150 relating to the comparative examples that are not provided with the rear cross member 18.

In the vehicle rear portion structure 10, because the seat frame 38 is structured to include the frame main body 40 that is disposed above the battery 46, the battery 46 is protected not only against impacts (inputs) from front, rear, left and right but also against impacts from above. Thus, the battery 46 is protected against, for example, loads (accelerations) of seat occupants P of the rear seat 36, luggage or the like placed on the rear seat 36, and the like.

Furthermore, in the vehicle rear portion structure 10, the high-voltage cable 52 and the cooling fan unit 54 are disposed in the battery accommodation space Rb formed by the rectangular frame RF, which is formed by the left and right rear side members 12, the center cross member 16 and the rear cross member 18, and the seat frame 38. Therefore, the high-voltage cable 52 and the cooling fan unit 54 are excellently protected against impacts on the hybrid automobile HV (particularly side impacts) and impacts from the rear seat 36 side.

In the vehicle rear portion structure 10, the battery 46 is fixed by fastening to both of the center cross member 16 and the rear cross member 18. Therefore, if a rear impact on the hybrid automobile HV occurs, the battery 46 is displaced forward in the vehicle together with (in conjunction with) the center cross member 16 and the rear cross member 18.

Figure 8A:
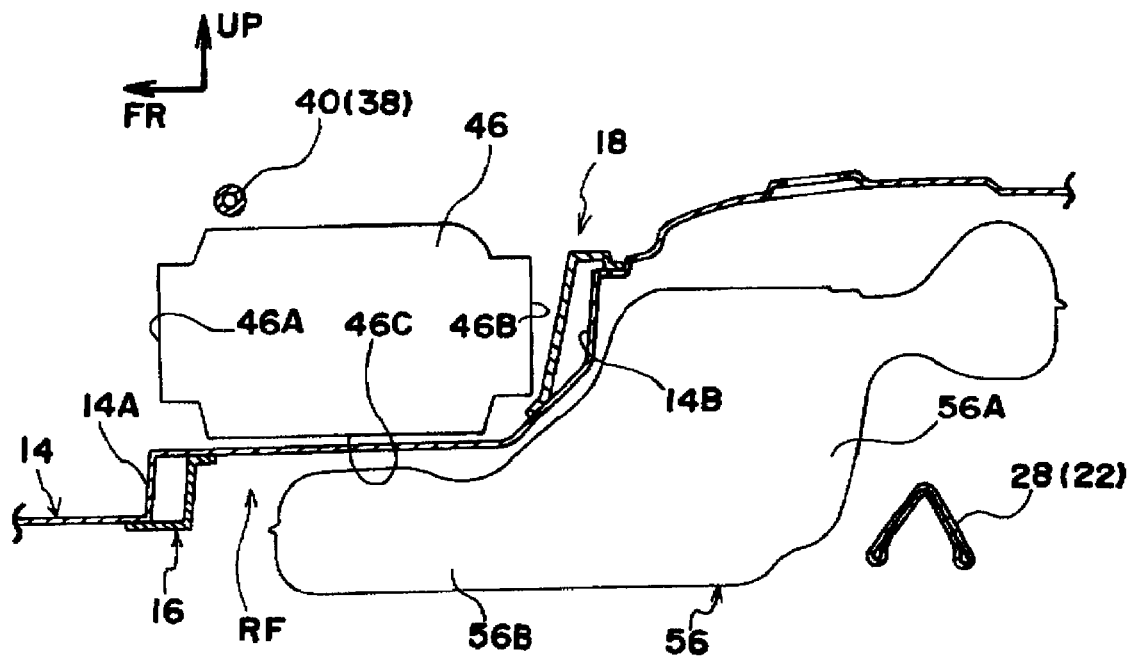
FIG. 8A is a side view illustrating a state of the vehicle rear portion structure relating to the first exemplary embodiment of the present invention prior to a rear impact.
Figure 8B:
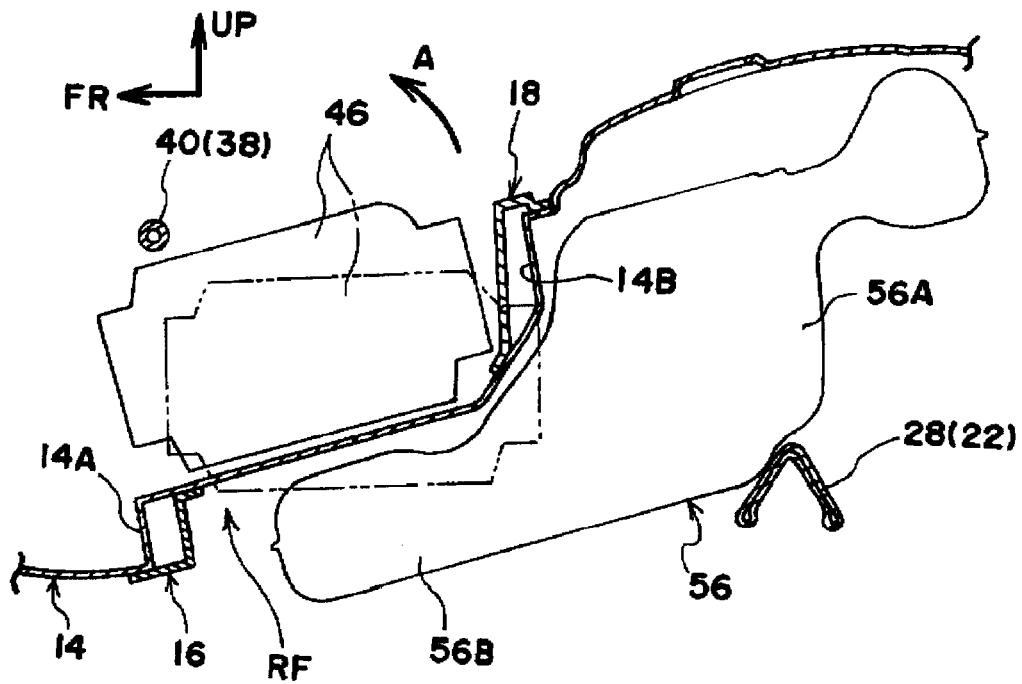
FIG. 8B is a side view illustrating a deformed state associated with a rear impact of the vehicle rear portion structure relating to the first exemplary embodiment of the present invention.

Supplementary to this point, if a forward-directed load is inputted to the rear ends of the rear side members 12 (the rear portion 12B), there is bending of front end portions of the rear side members 12 in the vehicle body constituting the vehicle rear portion structure 10. Accordingly, from the attitude prior to a rear impact that is illustrated in FIG. 8A, this vehicle body displaces in the manner of the rear cross member 18 rising up in the direction of arrow A as illustrated in FIG. 8B. At this time, in the vehicle rear portion structure 10, the battery 46 is displaced to follow (in conjunction with) body displacement while maintaining the state of being surrounded by the rectangular frame RF and the seat frame 38, that is, a state in which the battery accommodation space Rb is assured. Therefore, breakage or the like of the battery 46 itself by a rear impact is prevented or effectively suppressed. That is, in the vehicle rear portion structure 10, the battery 46 is excellently protected against a rear impact of the hybrid automobile HV in which it is employed.

In the vehicle rear portion structure 10, the battery 46 displaces forward in association with body deformation at a time of a rear impact of the hybrid automobile HV as described above. Therefore, if, for example, the fuel tank 56 displaces forward in the vehicle due to a displacement forward of the intermediate beam 28 in association with a rear impact, strong interference of the fuel tank 56 with the battery 46 is prevented as illustrated in FIG. 8B. Thus, in the vehicle rear portion structure 10, the fuel tank 56 too is excellently protected against a rear impact of the hybrid automobile HV in which it is employed. Note that the battery 46 shown by imaginary lines in FIG. 8B is the battery 46 prior to displacement forward by the rear impact.

In the vehicle rear portion structure 10, as described above, the left and right rear side members 12 and the rear cross member 18 are provided in addition to the center cross member 16. Therefore, in the vehicle rear portion structure 10, rigidity with respect to twisting of the vehicle body (relative displacement in the up-down direction of the left and right rear side members 12 shown by the arrows B in FIG. 5A) is higher than in the vehicle rear portion structures 100 and 150 relating to the comparative examples that are not provided with the rear cross member 18. In particular, because the rear cross member 18 is fastened to the upper faces of the rear side members 12 as illustrated in FIG. 5A, torsional rigidity of the vehicle body is improved in comparison with structures in which the rear cross member 18 is joined to the inner side faces of the rear side members 12. Hence, control stability of the hybrid automobile HV is improved.

Further, the rear cross member 18 is disposed to be close in the front-rear direction (in the present exemplary embodiment, overlapping in plan view) to the brackets 26 that form support points at the vehicle body for the trailing arms 24 structuring the rear suspension 22. Therefore, in the vehicle rear portion structure 10, torsional rigidity of the rear side members 12 with respect to inputs from the rear suspension 22 is high. That is, rigidity (point of application rigidity) of the rear side members 12 with respect to twisting in the direction of arrow C by loads Fs from the rear suspension 22 in the vehicle width direction, illustrated in FIG. 6, is high. Therefore, in the vehicle rear portion structure 10, the attitude of the rear suspension 22 is likely to be stable, and control stability is improved.

Second Exemplary Embodiment

Next, a second exemplary embodiment of the present invention is described with reference to FIG. 9 and FIG. 10. Herein, components and portions that are basically the same as in the first exemplary embodiment are assigned the same reference numerals as in the first exemplary embodiment, and descriptions and illustrations thereof may not be given.

Figure 9:
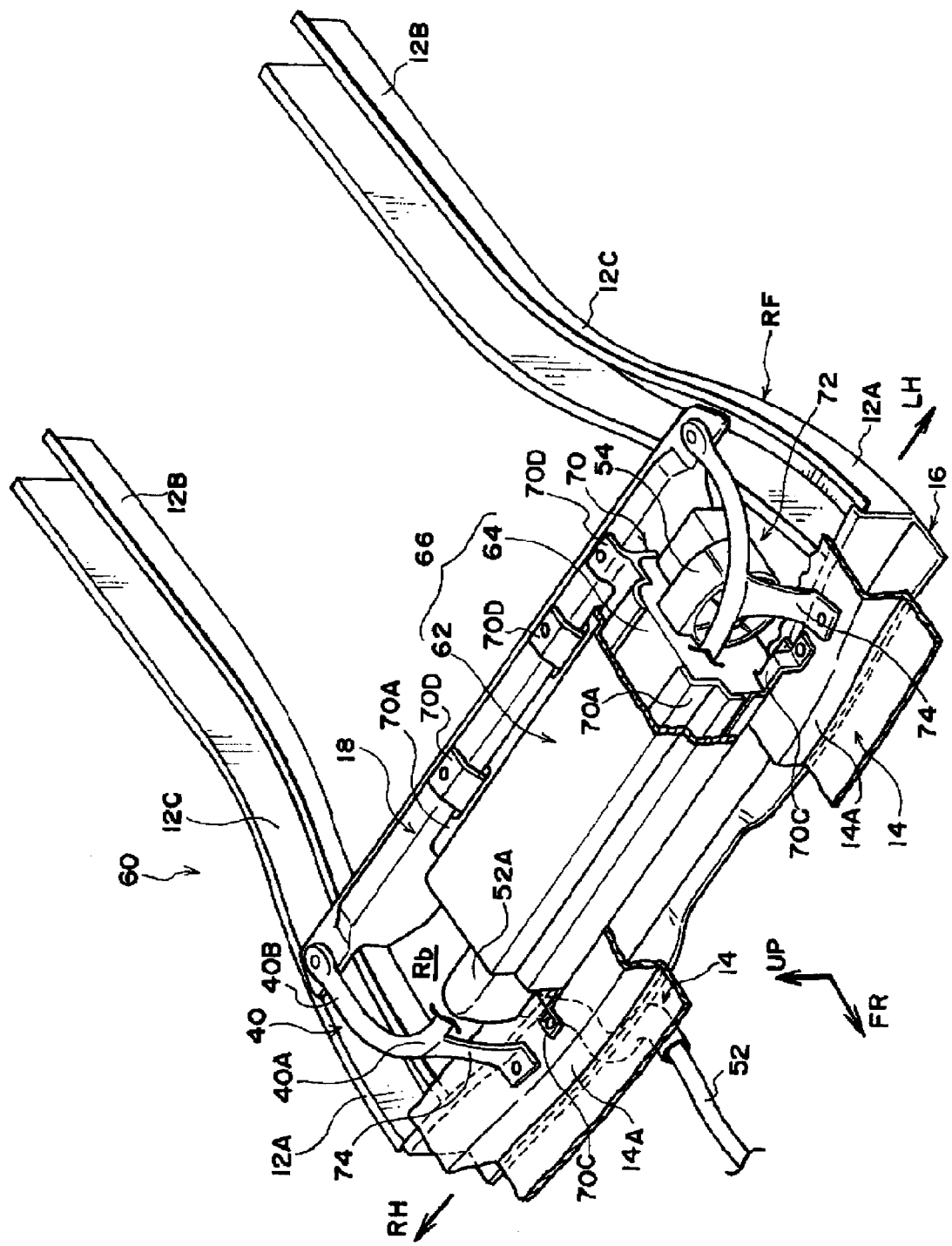
FIG. 9 is a perspective view schematically illustrating a vehicle rear portion structure relating to a second exemplary embodiment of the present invention.

In FIG. 9, a vehicle rear portion structure 60 relating to the second exemplary embodiment is illustrated in a perspective view corresponding to FIG. 3. As shown by the partial cutaway in this drawing, the vehicle rear portion structure 60 differs from the first exemplary embodiment in that, instead of the battery 46, a battery 66 is provided, which is formed with a battery main body 64 accommodated in a battery case 62 that serves as the battery protection member.

Figure 10:
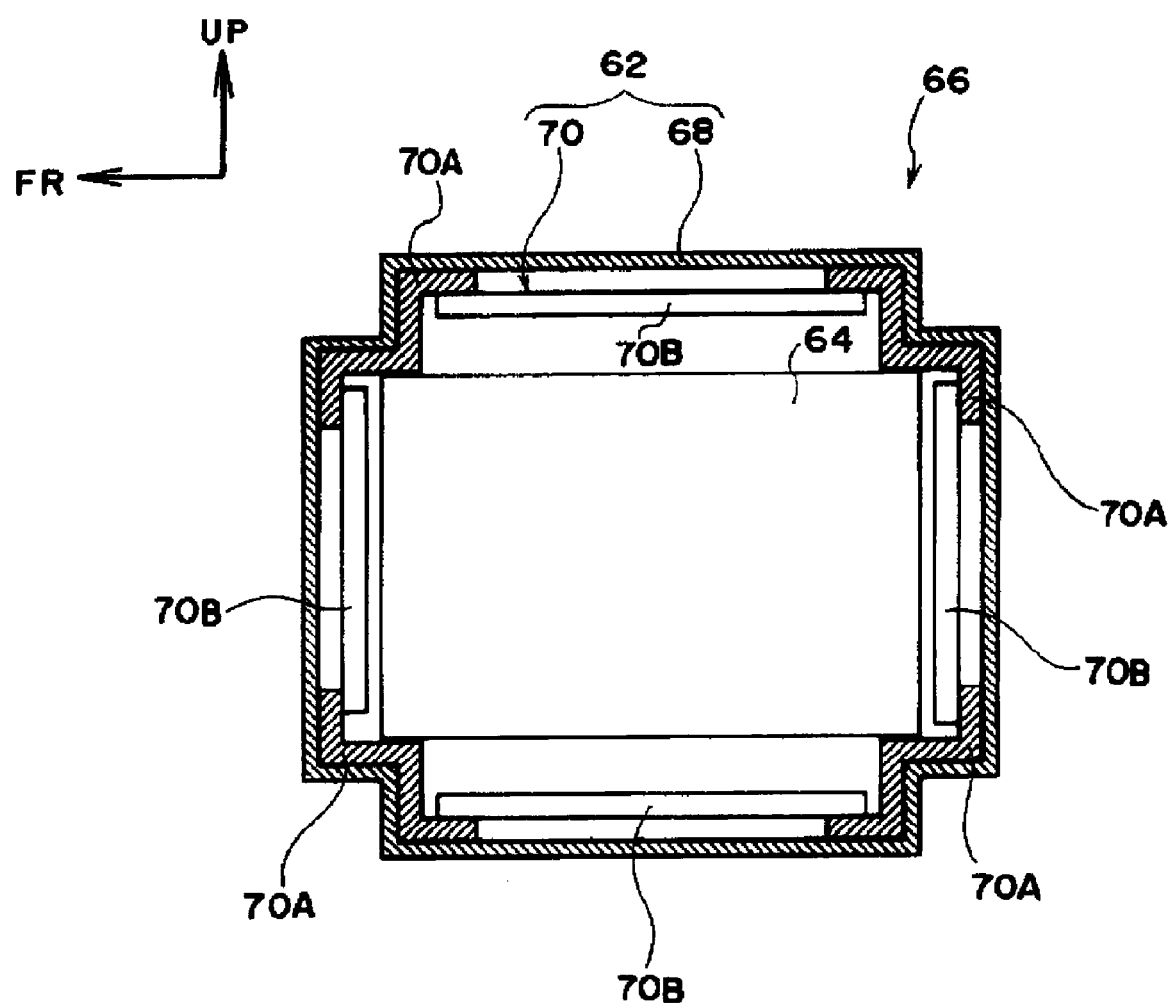
FIG. 10 is a side sectional diagram of a battery structuring the vehicle rear portion structure relating to the second exemplary embodiment of the present invention.

As illustrated in FIG. 10, the battery case 62 is structured with a case outer shell 68 that covers the battery main body 64 being reinforced by a case frame 70. The case frame 70 is structured to include four cross frames 70A and coupling frames 70B. The cross frames 70A are provided at four corners of the case outer shell 68, which forms a rectangular shape in side view, and extend in the vehicle width direction. The coupling frames 70B couple the neighboring cross frames 70A in a circumferential direction.

Figure 11:
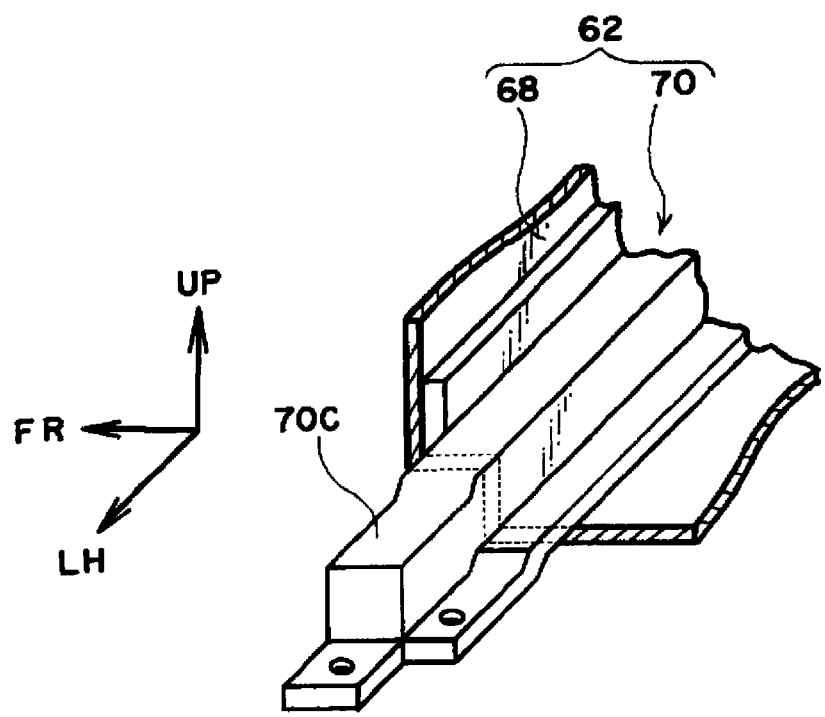
FIG. 11 is a perspective view illustrating in magnification a portion of fastening to a center cross member of the battery structuring the vehicle rear portion structure relating to the second exemplary embodiment of the present invention.

In the vehicle rear portion structure 60, as illustrated in FIG. 9 and FIG. 11, the battery 66 is fixed by fastening of the case frame 70 to the center cross member 16 and the rear cross member 18. Specifically, a pair of left and right vehicle body fixing portions 70C are protruded along the vehicle width direction from both ends in the vehicle width direction of, of the four cross frames 70A, the cross frame 70A that is disposed at the lower front corner portion. The left and right vehicle body fixing portions 70C are respectively fixed by fastening to the center cross member 16 at vehicle width direction outer sides relative to the battery main body 64.

Meanwhile, a plural number (three in this exemplary embodiment) of flanges 70D are protruded substantially rearward from, of the four cross frames 70A, the cross frame 70A that is disposed at the upper rear corner portion. In this exemplary embodiment, the flanges 70D are disposed at the same positions as the positions at which the brackets 50 of the first exemplary embodiment are disposed, and are fixed by fastening to the rear cross member 18. The above-mentioned battery case 62 (the case frame 70) corresponds to the battery protection member of the present invention, and the cross frames 70A and coupling frames 70B of the battery case 62 that are disposed at the upper side relative to the battery main body 64 correspond to the battery protection portion of the present invention.

The vehicle rear portion structure 60 is provided with a seat frame 72 to serve as the battery protection member instead of the seat frame 38. The seat frame 72 is structured with the frame main body 40 and a pair of left and right leg portions 74 as principal portions. The left and right leg portions 74 are formed to be thinner (with a smaller cross section) than the leg portions 42 of the seat frame 38, and the number of fastening points thereof to the center cross member 16 is set to be smaller. Thus, the seat frame 72 enables a reduction in weight relative to the seat frame 38. Other structures of the vehicle rear portion structure 60 are the same as the corresponding structures of the vehicle rear portion structure 10, including unillustrated portions.

Thus, apart from operational effects relating to protection of the battery 46 by the seat frame 38, basically the same effects may be provided by the same operations by the vehicle rear portion structure 10 relating to the second exemplary embodiment as by the vehicle rear portion structure 10 relating to the first exemplary embodiment. In the vehicle rear portion structure 60, the battery case 62 (the seat frame 72) fulfils a function of protecting the battery main body 64 against a load from the upper side (the rear seat 36 side), and a function of dispersing support of a side load and propagating the same to the opposite side from an impact. With this structure too, the high-voltage cable 52 and the cooling fan unit 54 are protected by the seat frame 72.

Herein, the rear seat of the present invention may be understood as being a seat that is disposed at the rear wheels 32 side among seats that are disposed between the axles of front wheels and the rear wheels 32. Thus, the rear seat of the present exemplary embodiment may be, for example, a second row seat or may be a third row seat. The concept thereof includes a driver seat and a passenger seat in a vehicle with two seats (one row front to rear).

In a hybrid automobile HV or a vehicle that has both a metal plate structure underbody and the fuel tank 56, in which the vehicle rear portion structure 10 or 60 is employed, a structure may be formed in which, for example, a storage case is provided below the rear seat 36 instead of the battery 46.

The invention claimed is:
1. A vehicle structure of a hybrid vehicle comprising:
a battery disposed at a lower side in a vehicle up-down direction of a rear seat such that at least a portion thereof overlaps with the rear seat in a plan view;
a fuel tank including
a shallow profile portion that is disposed at the lower side in the vehicle up-down direction relative to a floor face of the battery such that at least a portion thereof overlaps with the battery in plan view, and a deep profile portion that is formed with a higher height in the vehicle up-down direction than the shallow profile portion and that is disposed at a rear side in a vehicle front-rear direction relative to a rear face of the battery such that at least a portion thereof overlaps with the battery in an elevational view;

a pair of left and right side members that are formed to be long in the vehicle front-rear direction;

a first cross member that is formed to be long in a vehicle width direction and spans between the pair of side members; and a second cross member that is formed to be long in the vehicle width direction and spans between the pair of side members at the rear side in the vehicle front-rear direction relative to the first cross member, wherein the battery is disposed so as to be surrounded in plan view by the pair of side members and the first and second cross members, and the second cross member spans between the pair of side members, passing between a rear face of the battery that faces to the rear side in the vehicle front-rear direction and a front face of the deep profile portion of the fuel tank that faces to the front side in the vehicle front-rear direction.

2. The vehicle structure of a hybrid vehicle according to claim 1, wherein the battery is disposed at the upper side in the vehicle up-down direction relative to the first cross member, such that a front end portion of the battery in the vehicle front-rear direction is disposed within the extent of a width in the vehicle front-rear direction of the first cross member in plan view.

3. The vehicle structure of a hybrid vehicle according to claim 2, wherein the shallow profile portion of the fuel tank is disposed at the rear side in the vehicle front-rear direction relative to the first cross member such that at least a portion thereof overlaps with the first cross member in elevational view.

4. The vehicle structure of a hybrid vehicle according to claim 1, further comprising a battery protection member that includes:

vehicle body fixing portions that are fixed to the first cross member and the second cross member; and a battery protection portion that is disposed at the upper side in the vehicle up-down direction relative to the battery.

5. The vehicle structure of a hybrid vehicle according to claim 4, wherein the vehicle body fixing portions are fixed to both of vehicle width direction outer sides relative to the battery of at least one of the first cross member and the second cross member.

6. The vehicle structure of a hybrid vehicle according to claim 4, wherein the battery protection member is structured to include a seat frame that structures the rear seat.

7. The vehicle structure of a hybrid vehicle according to claim 4, wherein the battery protection member is structured to include a battery case that accommodates the battery.

8. The vehicle structure of a hybrid vehicle according to claim 1, wherein the battery is fixed to each of the first cross member and the second cross member.

* * * * *

UNITED STATES PATENT AND TRADEMARK OFFICE
CERTIFICATE OF CORRECTION

PATENT NO. : 8,393,426 B2  Page 1 of 1
APPLICATION NO. : 13/146904
DATED : March 12, 2013
INVENTOR(S) : Takahashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 20 days.

Signed and Sealed this
First Day of September, 2015

Michelle K. Lee
*Director of the United States Patent and Trademark Office*